(12) United States Patent
Cardenas et al.

(10) Patent No.: US 7,483,023 B2
(45) Date of Patent: Jan. 27, 2009

(54) MODEL BASED ADAPTIVE MULTI-ELLIPTICAL APPROACH: A ONE CLICK 3D SEGMENTATION APPROACH

(75) Inventors: Carlos E. Cardenas, Bordentown, NJ (US); Steven F. Owens, Denville, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 420 days.

(21) Appl. No.: 11/377,983

(22) Filed: Mar. 17, 2006

(65) Prior Publication Data

US 2006/0210160 A1 Sep. 21, 2006

Related U.S. Application Data

(60) Provisional application No. 60/662,766, filed on Mar. 17, 2005.

(51) Int. Cl.
*G06T 15/00* (2006.01)
*G09G 5/00* (2006.01)
*G06K 9/34* (2006.01)
*G06K 9/46* (2006.01)
*A61B 5/05* (2006.01)

(52) U.S. Cl. .................. 345/419; 382/173; 382/195; 382/199; 382/203; 345/424; 345/622; 600/340

(58) Field of Classification Search .............. 382/173, 382/195, 203, 205, 154, 128–132, 199, 254, 382/260, 276, 282, 181; 345/418–420, 424, 345/588, 618–619, 622, 660, 671–672; 600/300, 600/309, 340, 458
See application file for complete search history.

(56) References Cited

U.S. PATENT DOCUMENTS

| | | | |
|---|---|---|---|
| 5,048,095 A | 9/1991 | Bhanu et al. | |
| 5,859,891 A | 1/1999 | Hibbard | |
| 5,949,905 A | 9/1999 | Nichani et al. | |
| 6,249,594 B1 | 6/2001 | Hibbard | |
| 6,813,373 B1 | 11/2004 | Suri et al. | |
| 2005/0207630 A1* | 9/2005 | Chan et al. | 382/131 |
| 2005/0259854 A1* | 11/2005 | Arimura et al. | 382/130 |
| 2006/0182340 A1* | 8/2006 | Cardenas et al. | 382/173 |
| 2006/0221399 A1* | 10/2006 | Hansen et al. | 358/3.06 |

* cited by examiner

*Primary Examiner*—Wesner Sajous
(74) *Attorney, Agent, or Firm*—Peter L. Kendall

(57) ABSTRACT

A seed point is selected inside a structure that is to be segmented in image data. An adaptive model is defined around the seed point, and a preprocessing filter is applied only within the bounding region. A presegmentation of the preprocessed result is performed, and the bounding region is expanded if necessary to accommodate the presegmentation result. An adaptive model for post-processing may be used. The model is translated, rotated and scaled to find a best fit with the pre-segmented data. Additional models can be grown based on testing performed on points on a perimeter of previous models to improve the segmentation of an object.

18 Claims, 18 Drawing Sheets

MODEL BASED ADAPTIVE MULTI-ELLIPTICAL APPROACH: A ONE CLICK 3D SEGMENTATION APPROACH

CROSS-REFERENCE TO RELATED APPLICATIONS

This application claims the benefit of U.S. Provisional Application No. 60/662,766, filed Mar. 17, 2005, which is incorporated herein by reference.

BACKGROUND OF THE INVENTION

The present invention relates to the segmentation of anatomical structures and more particularly to the segmentation of structures within medical imaging data.

The identification of structures like tumors, the bladder, kidney, etc. is one of the most time consuming tasks in the workflow of the medical diagnostic workplace. One of the reasons is the difficulty in generalizing the steps necessary for the successful segmentation of these objects in medical imaging data.

Despite extensive research, the identification of these structures is still carried out by manual segmentation tools. Further, with the increasing resolution of the new generations of scanners, the segmentation time is expected to increase. This will lead to an even more substantial and time consuming process.

Each of these issues directly affects the quality of the measurements as well as the quality of the medical diagnosis and service provided to patients. The tedium of the present procedures can result in user fatigue as well as poor segmentation of the structures.

Accordingly, new and improved methods and systems for segmenting structures within imaging data are needed. In particular, it would be highly desirable to make available systems that reduce the amount of time and effort that medical personnel must exert to segment structures in medical imaging data.

SUMMARY OF THE INVENTION

The present invention is an image processing method and system that allows the segmentation of structures like tumors, kidneys, bladders with a "one mouse click" approach and which is based on the combination of several image processing filters. In accordance with one aspect of the present invention, a seed point is placed inside the structure to be segmented. The procedure performs preprocessing, pre-segmentation and post processing filters with advanced image processing tools that are based on partial differential equations.

The kind of structure that can be segmented is not limited—both inhomogeneous and homogeneous can be segmented successfully. Adaptive models are used to restrict the area where the segmentation procedures are applied so that the time for segmenting the structure is reduced to a minimum. The models are computed on the fly and are defined by predefined constraints based on the geometrical appearance of the structure, statistical description based on principal components and shape.

In accordance with one aspect of the present invention, a method for segmenting a structure in a set of image data, the structure being identified by a seed point. The method includes defining a bounding shape around the seed point, the bounding shape having different boundaries. The area covered by the bounding shape is pre-processed, presegmented and also tested within the bounding shape. If the region touches any of the one or more boundaries, the touched bounding shapes are expanded. In accordance with another aspect of the present invention, the bounding shape is expanded at any of the one or more boundaries that are touched by the region. The method further involves repeating the steps of and expanding the bounding shape, preprocessing and pre-segmentation until the pre-segmented region does not touch any of the one or more boundaries and generating a final segmentation of the structure.

Another aspect of the present invention also involves outputting the final segmentation to an output or storage device.

In accordance with a further aspect of the present invention, the bounding shape is a bounding box. In accordance with another aspect, the bounding shape is elliptic.

The present invention also involves pre-filtering the image data with an edge preserving smoothing filter. The filtering is preferably performed only within a selected area, that is, the area in the bounding shape, thereby minimizing processing time and requirements. It is preferred to use an anisotropic diffusion filter to pre-filter the image data.

The process, in accordance with a further aspect of the present invention, is performed iteratively. Once a shape, including a box or an ellipse, is grown inside the object to be segmented, points on the shape are tested. In accordance with one aspect of the present invention, the points on the perimeter of the shape are tested. In accordance with another aspect of the present invention, all of the points on the perimeter of the shape are tested. If the points meet certain requirements, they are treated as seed points and additional shapes are grown around those seed points. This process continues iteratively until the testing of the points on the perimeter of the shapes no longer satisfies the requirements.

In accordance with a method of the present invention for segmenting an object in a set of image data wherein a first shape has been grown inside the object based on a seed point, points on a perimeter of the first shape are tested to determine a first set of one or more seed points and a second shape is grown inside the structure based on one of the seed points in the first set.

The method also includes testing points on a perimeter of the second shape to determine a second set of one or more seed points and growing a third shape inside the structure based on one of the seed points in the second set.

The method further includes growing a third shape inside the structure based on another of the seed points in the first set.

The steps of testing for new seed points and growing new shapes continues iteratively until segmentation is complete.

The seed points are preferably located on the perimeter of the first shape. Additionally, each of the one or more seed points are inside the pre-segmented object and have a predetermined amount of space around it. In one embodiment, there is at least 5 mm. of space of the object around a seed point.

The processing continues until each of the seed points in the further set of seed points do not have 5 mm of object space around it.

DESCRIPTION OF EXEMPLARY EMBODIMENTS

Figure 1:
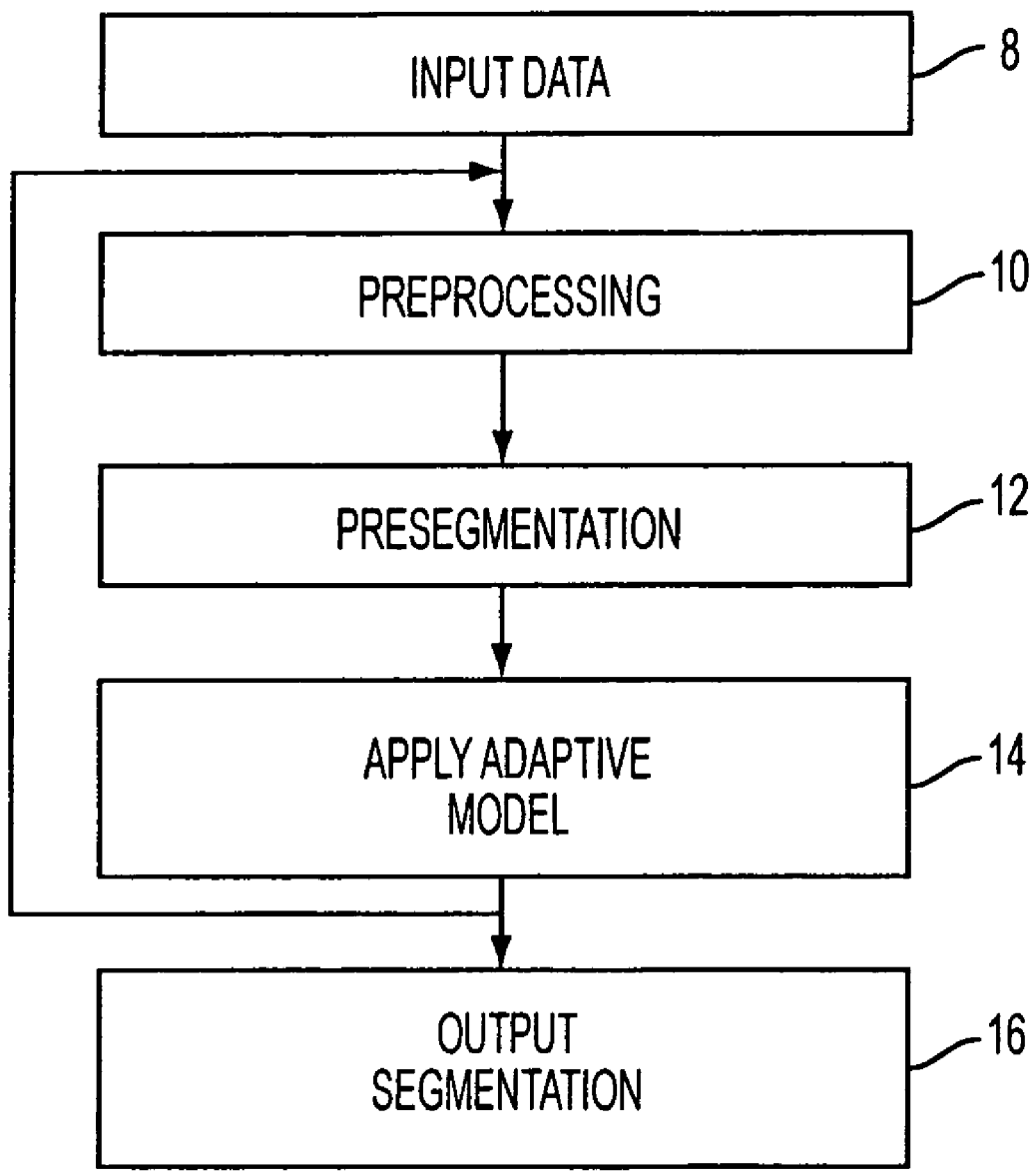
FIG. 1 illustrates steps performed in accordance with one aspect of a method in accordance with one aspect of the present invention.

FIG. 1 illustrates the method in accordance with one aspect of the present invention. In step 8, medical image data is input into a computing system in accordance with one aspect of the present invention. In step 10, preprocessing on the image data is performed. In step 12, presegmentation on the image data is performed. In step 14, an adaptive model is applied to segment a structure in the medical image data. In step 16, the segmented structure, along with any other desired image information, is output to a user.

In step 14, there are two different adaptive models that can be used in accordance with various aspects of the present invention. The first adaptive model is an adaptive bounding box model and the second is an elliptical model approach. The steps illustrated in FIG. 1 as well as the different adaptive models will be explained further.

The first step 8 is to input medical image data. While the segmentation has been applied to CT, PET and MR images, there are no limitations on the kind of input images or modalities that the segmentation procedure of the present invention supports. Ultrasound images, fMRI, etc. can be used as input images. There are no restrictions regarding the format of the image, any physical variation like pixel spacing, slice location, dimension of the image, etc. It is assumed that one can always convert the input images into gray- scale images, and that one can handle the gray values of the images. The segmentation procedure does not need any predefined models or settings.

The only input needed to begin the process is one or more mouse clicks on the structure to be segmented. The rest of the workflow is done automatically. Around seed-points, the initial adaptive model is set. The initial adaptive model can be a bounding box, an ellipsoid or other shapes. The refinement of the model can be also be performed semi-automatically in dialog with the user. The user can change the model in order to prevent the algorithm to grow out of all bounds which is specially important in extreme cases.

The next step 10 in the segmentation process is the preprocessing that is performed inside the initial adaptive model. The textures of the input images vary from case to case. One difficulty arises when the dataset evidences noise or the area to be segmented is inhomogeneous. Noise in the image or inhomogeneous areas reduce the capacity of the image processing filter to identify regions. In those cases high gradient textures may interfere with the expansion of the contour when using segmentation functions like region growing. Using a gradient approach without preprocessing could cause e.g. an under-segmentation of the structure. It is therefore necessary to include preprocessing into the segmentation workflow, preferably by using an edge-preserving smoothing filter.

Although filters like Median and Gauss smooth the image area and can also be applied on a 3D dataset without straining the CPU, they tend to blur away the sharp boundaries and also to distort the fine structure of the image, thereby changing aspects of the anatomical shapes. For a discussion on the Median, Gauss filters, see Gonzalez RC, Woods RB: Digital Image Processing, Addison-Wesley, Reading, Mass. 1993.

Consequently it is preferred to apply more sophisticated techniques. In accordance with a preferred embodiment of the present invention, a partial differential (PDE) based method called "non linear diffusion" filter is used. See, for example, Morton KW, Mayern DF, Numerical Solution of Partial Differential Equations, Cambridge University Press, Cambridge, 1994 and Weickert J.: Non linear Isotropic Diffusion H: Semidiscrete and discrete Theory, Fakultaet fuer Mathematik and Informatik, Universitaet Mannheim, 2001. This type of filter was first proposed by Perona and Malik. See, for example, Perona P, Malik: Scale-space and edge detection using anisotropic diffusion, IEEE Transactions on Pattern Analysis Machine Intelligence, 12:629-639, 1990 as well as Weickert J: Foundations and application of non linear anisotropic diffusion filtering, Zeitschrift fuer angewandte Mathematik und Mechanik, Vol 76, pp 283-286, 1996.

This filter offers the option to smooth the image and simultaneously enhance edges by using a non uniform process which is adapted to the local image structures and which applies less diffusion at those regions where high contrast is found. These areas can be measured by using the diffusion coefficient equation (Eqn 1) where $\lambda$ is a constant and $\nabla I$ is the image gradient magnitude. By solving the partial differential equation (Equ. 2), the diffusion and edge detection converge in one single process where $I=I(x,y,z,t)$ is the 3D image and t represents the iteration step or time.

$$(|\nabla I|^2) = \frac{1}{1 + \frac{|\nabla I|^2}{\lambda^2}} \quad \text{Eqn. 1}$$

$$\frac{\partial I}{\partial t} = \nabla \cdot (c(|\nabla I|^2)\nabla I) \quad \text{Eqn. 2}$$

The anisotropic diffusion filter has been successfully applied for smoothing the inhomogeneous areas, reducing noise while preserving and also enhancing the contours of the image. The images become homogeneous so that region growing based approaches can be used to apply segmentation successfully.

The non linear diffusion filter requires a lot of computing power. The time necessary for applying it on a dataset with about 60 slices and a resolution of 512 by 512 on a Pentium 4 machine would exceed 10 minutes, which makes this preprocessing step unacceptable for the clinical routine. In order to use this filter and take advantage of the characteristics of the non linear diffusion filter, the preprocessing step is preferably applied only inside of the adaptive model that allows the selection of the region of interest reducing the time for preprocessing to an interval of less than a second to a couple of seconds, depending on the size of the structure to be segmented.

The pre-segmentation step involved the segmentation of the structure only inside of the area defined by the adaptive model (step 12). Image Processing Functions like Region Growing, Snake, etc. can be used to perform this step.

In step 14, an adaptive model is used. Two different adaptive models have been developed and implemented. They are: an adaptive bounding box model approach and an adaptive elliptical model based approach.

Figure 2:
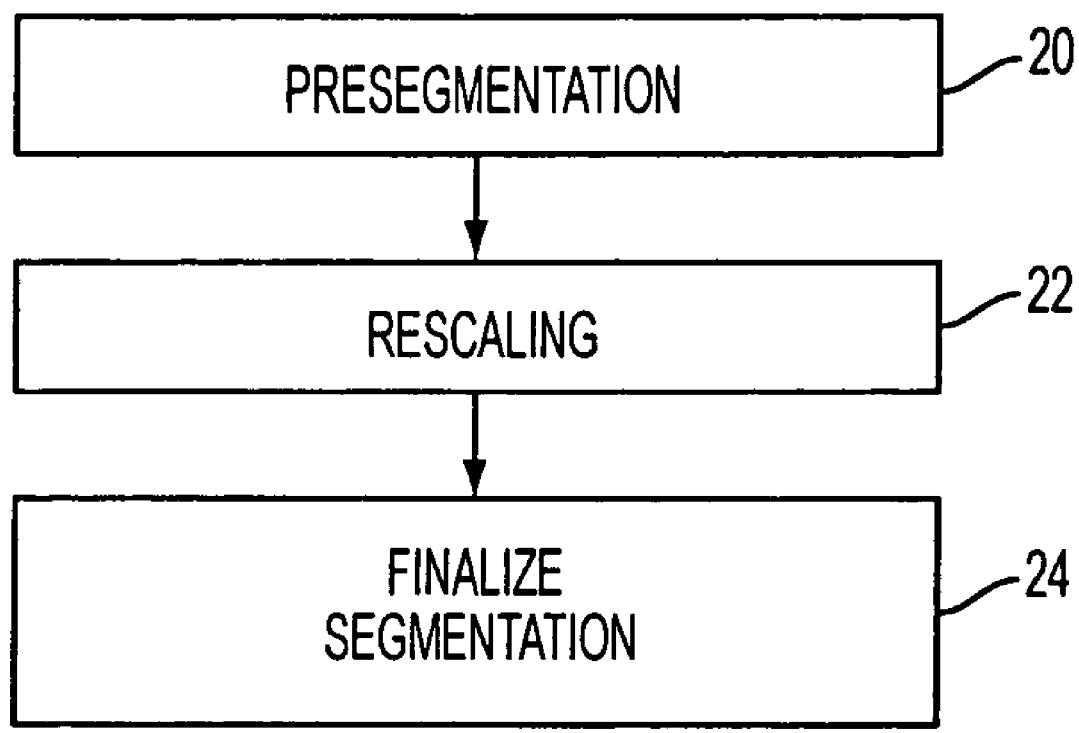
FIG. 2 illustrates steps performed in an adaptive processing step in accordance with one aspect of the present invention.

The bounding box model will be described first. FIG. 2 illustrates the steps in accordance with one aspect of the bounding box model. In step 20, presegmentation processing is performed. Then in step 22, rescaling is performed and, in step 24, final segmentation is performed.

Figure 3:
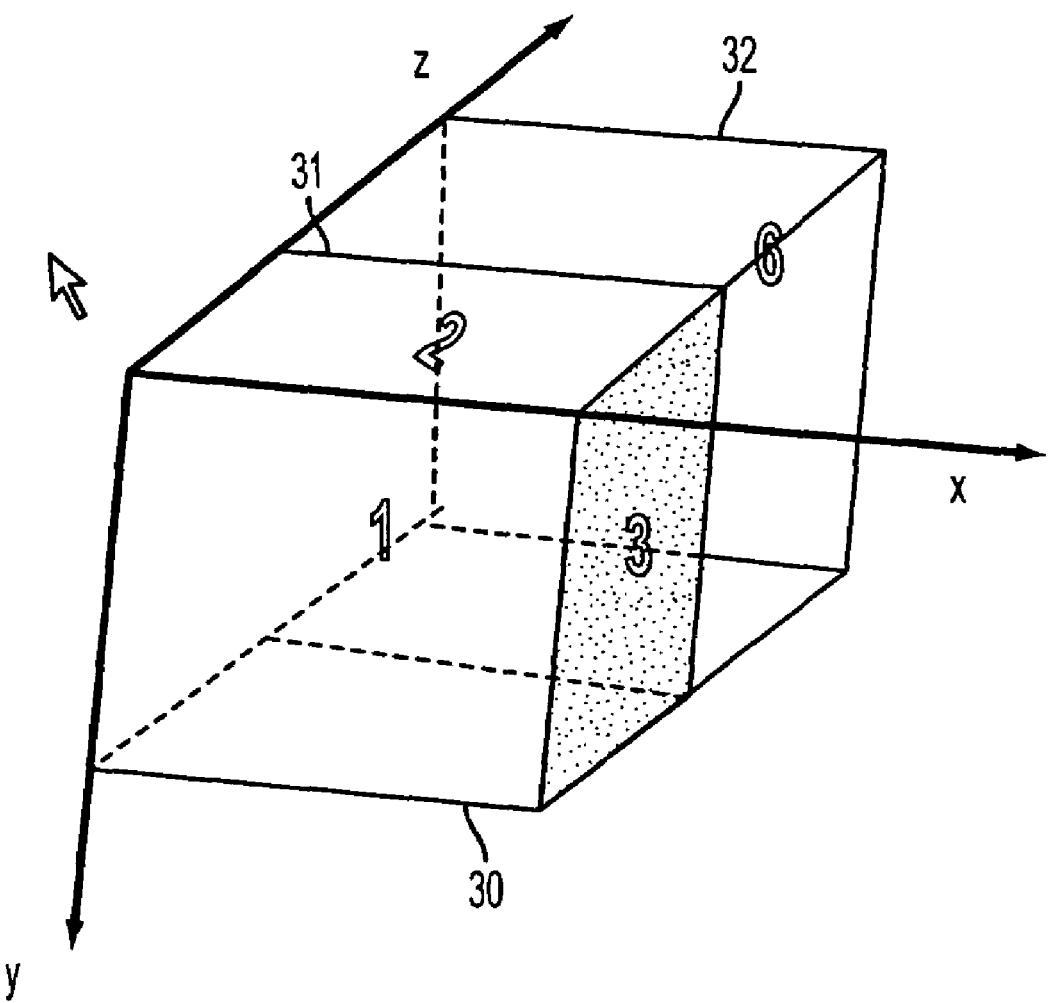
FIG. 3 to 8 illustrate various aspects of the adaptive processing step shown in FIG. 2.

Referring now to FIG. 3, and taking as example the three dimensional space, a 3D bounding box is used as initial adaptive model (30), the area to be segmented is divided in 6 different parts which represent the 6 sides of the 3D box. Each side of the box is tested separately.

The procedure starts after a seed point is set inside the area to be segmented. Around this point an initial three dimensional bounding box (30) is set (e.g. 10×10×3). The non linear diffusion is performed only inside the area defined by the bounding box. After the preprocessing, a presegmentation filter is applied. For example, a region based filter like region growing described in Bernd J.: Digitale Bildverarbeitung, Springer-Verlag, Berlin, Heidelberg, N.Y. 1993, is applied to detect all the neighbor voxels with similar gray value intensities. The preprocessing smoothes the texture so that the region marked by the bounding box becomes homogenous.

The boundary test is applied on each side of the bounding box (30). In the case that one side of the bounding box is touched by the result of the presegmentation, this side is enlarged. So, for example, in FIG. 3, side 6 (the far side of the box (30)) started having a boundary 31 in the z direction, but was touched by region growing and, consequently, side 6 is extended to boundary 32 in the z direction.

If at least one side was enlarged, then the procedure is repeated using the new enlarged bounding box as the input parameter. Thus, the model is rescaled. After rescaling the model, two different options can be used: the already segmented area can be reused or the procedure can perform the prefiltering and presegmentation the whole area based on the rescaled model.

Figure 4:
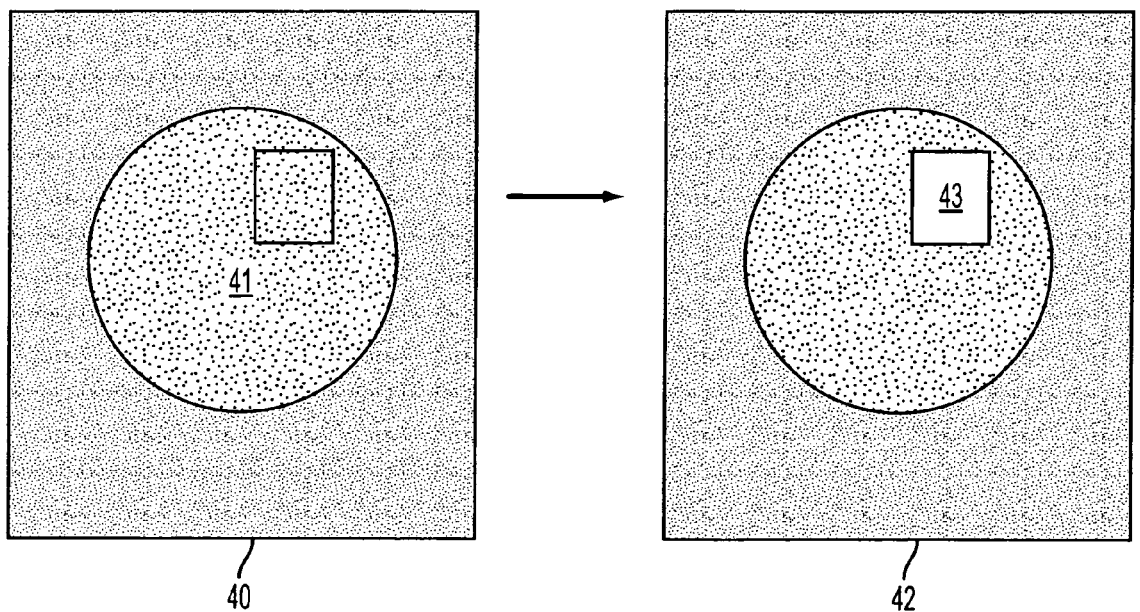
Figure 5:
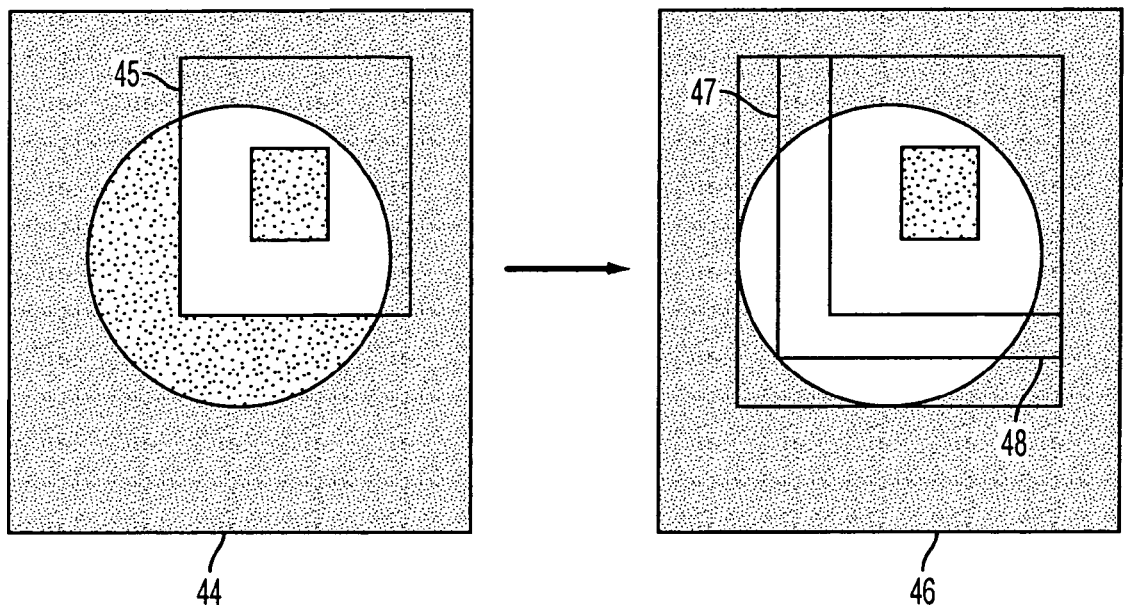
Figure 6:
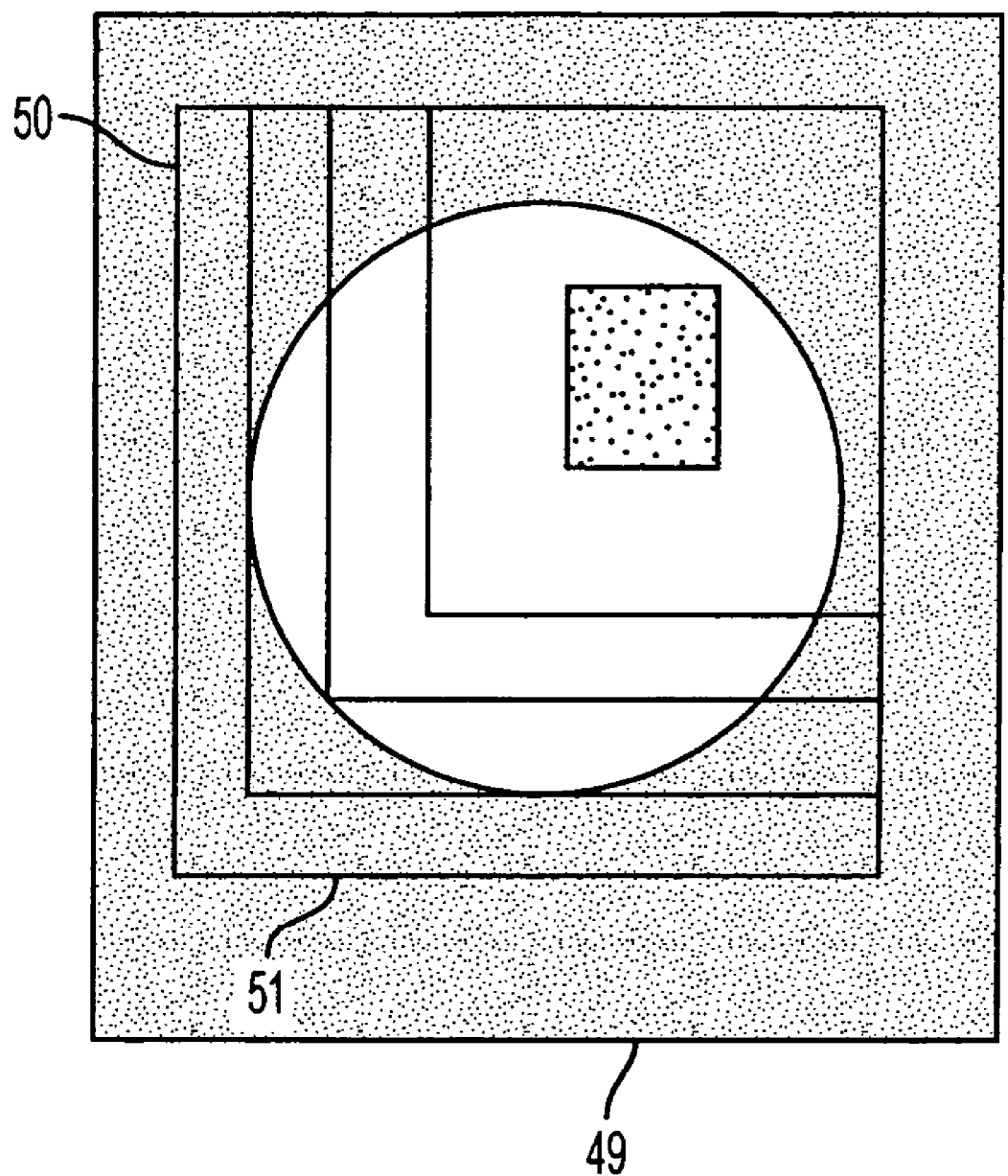

FIGS. 4 to 6 demonstrate the basic steps of segmentation progress on a circle. Each depiction represents an iteration step in the process of the present invention. In image 40 in FIG. 4, there is a structure 41 to be segmented. In the next iteration 42, a bounding box 43 is generated. Referring now to FIG. 5, a region inside the bounding box 43 is grown. In the iteration 44, each side of the box 43 is contacted by the region being grown. Thus, each side of the box is expanded to new boundaries 45. In the next iteration 46, the region is grown again. This time, only the left side and the bottom side of the bounding box 43 are contacted by the region being grown. Thus, the left side of the bounding box 43 is expanded to boundary 47 and the bottom side of the bounding box 43 is expanded to boundary 48. In the next iteration 49, the region is grown again. Again, only the left side and the bottom side of the bounding box are contacted by the region being grown. Accordingly, the left side of the bounding box 43 is expanded to boundary 50 and the bottom side of the bounding box 43 is expanded to boundary 51. Since a boundary was contacted, the region is grown again. This time, there is no boundary of the bounding box 43 contacted and the process is ready for the final segmentation.

The final segmentation step will now be discussed. If the intensity values of the area to be segmented differ from the surrounding area, a simple segmentation method such as region growing is sufficient to achieve the segmentation. However, in many images, this is not the case. Thus, other criteria were integrated to find the boundaries for the structures. One of the criteria used with success for preventing leaking is the process of monitoring the number of voxels found on each bounding box side in the iteration. When the number of voxels changes drastically in one side of the bounding box, the iteration on this side is stopped. Using this method a control on the growth procedure is performed.

Figure 7:
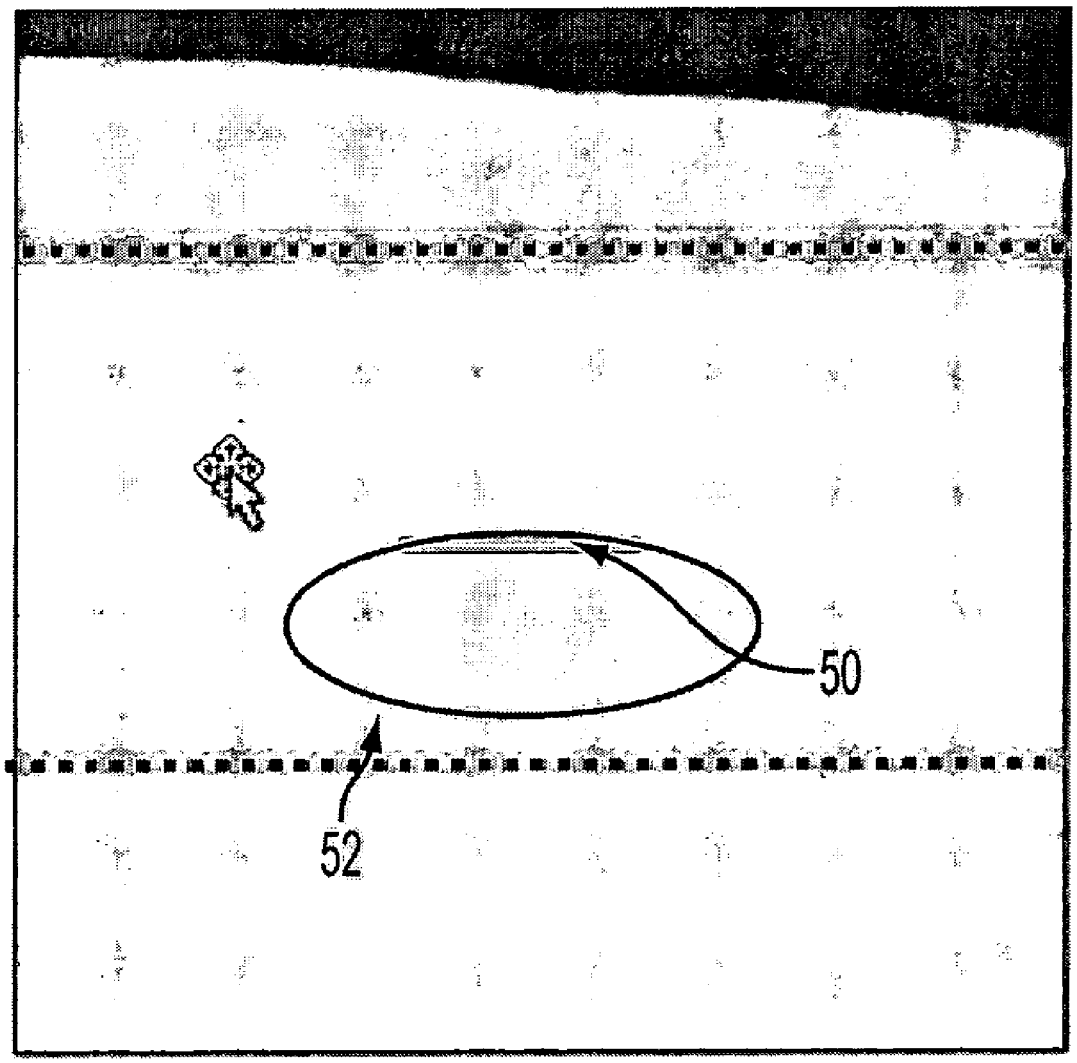
Figure 8:
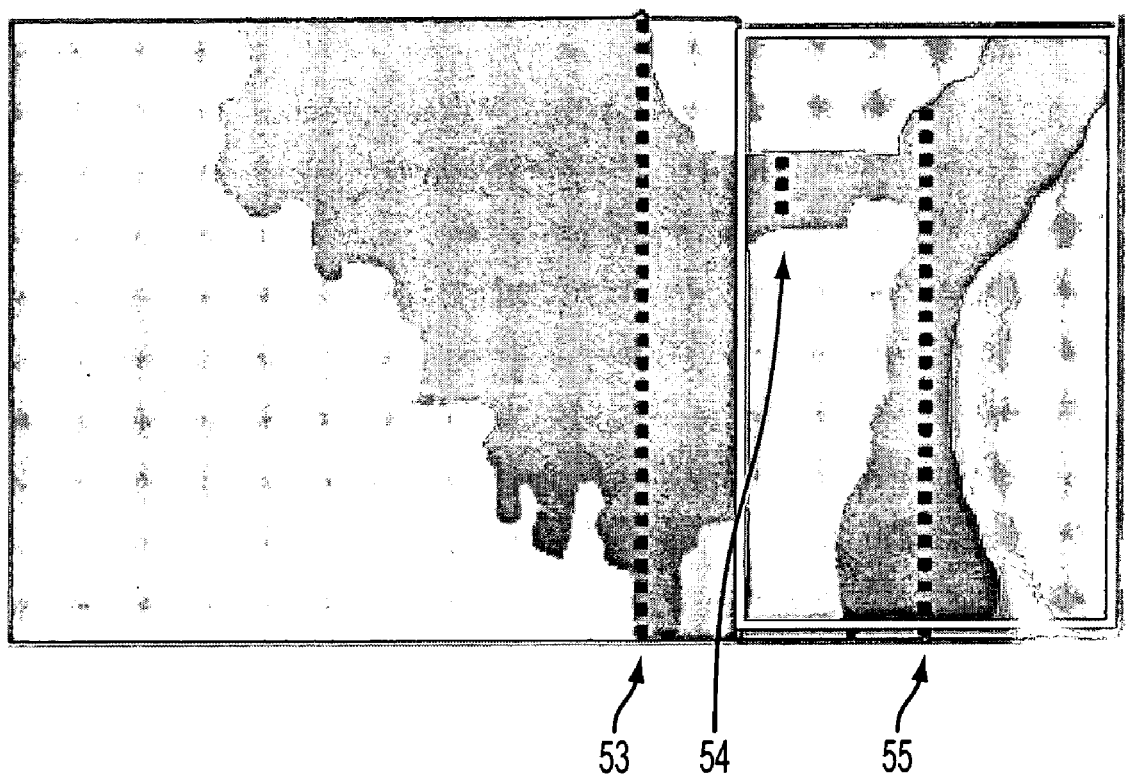

FIG. 7 shows the segmentation of a tumor without the growth control criteria. The dashed lines are two of the bounding box limits. An over segmentation is performed because of the similarity between the intensity values of the tumor and the surrounding area. After the introduction of the growth control criteria, the boundaries of the tumor are detected correctly which is denoted by line 50 showing the tumor boundary found (the darker area inside of 52 is the real tumor and final segmentation). Another criteria used for avoiding leakage is based on the predefined constraints about the shape of the structure (e.g. the structure does not have bottlenecks). The number of voxels per iteration is recorded. A comparison between voxels through different iterations allows us to verify whether a bottleneck exists, so that the growth procedure can be stopped. Bottleneck occurs when the pre-segmented result tunnels through a narrow link from one area to another, resulting in a decreasing number of voxel added per iteration, which then rises again when entering the other area. FIG. 8 shows the segmentation result of one slice without the bottleneck filter. Applying the bottleneck filter eliminates the area inside the box inside the white lines from the segmentation result. Notice how the number of voxels denoted by the dashed lines decrease from 53 to 54 increasing again in 55.

In the case that none of the sides was enlarged, a post processing procedure is applied which is based on performing a morphological opening operation with an elliptical shaped filter element to separate the structure to be segmented from leak regions. On that result a connected component filter is applied and only the component touching the seed point is kept while the others are discarded.

The pseudo code below shows an implementation of the invention method after an initial bounding box has been placed around a seed point:

```
do {
    // increase size of bounding box
    if (isBoxAllowsToGrowFront)      if (!increaseArea( FRONT ))          I
            isBoxAllowedToGrowFront = false;
    if (isBoxAllowsToGrowBack)       if (!increaseArea( BACK ))
        isBoxAllowedToGrowBack  = false;
    if (IsBoxAllowsToGrowTop)        if (!increaseArea( TOP ))
        isBoxAllowedToGrowTop   = false;
    if (isBoxAllowsToGrowBottom)     if (!increaseArea( BOTTOM ) )
    isBoxAllowedToGrowBottom=false;
    if (isBoxAllowsToGrowRight)      if (!increaseArea( RIGHT ))
    isBoxAllowedToGrowRight = false;
    if (isBoxAllowsToGrowLeft)       if (!increaseArea( LEFT ))
    isBoxAllowedToGrowLeft  = false;
    // run preprocessing filter (e.g. Non Linear Filter)
    filteredRawImage = runPreprocessingFilter( );
    // run criteria filter (e.g. region growing)
    preSegmentedImager =
    runPresegmentationFilter(filteredRawImage);
    // testing whether bounding box sides are touched by the
    result of the criteria filter
    if ( ! ( letBoxGrowUp (FRONT, preSegmentedImage) ) )
    isBoxAllowedToGrowFront  = false;
    if ( ! ( letBoxGrowUp (BACK, preSegmentedImage) ) )
    isBoxAllowedToGrowBack   = false;
    if ( ! ( letBoxGrowUp (TOP, preSegmentedImage) ) )
    isBoxAllowedToGrowTop    = false;
    if ( ! ( letBoxGrowUp (BOTTOM, preSegmentedImage) ) )
    isBoxAllowedToGrowBottom =false;
```

-continued

```
if ( ! ( letBoxGrowUp (RIGHT, preSegmentedImage) ) )
  isBoxAllowedToGrowRight   = false;
if ( ! ( letBoxGrowUp (LEFT, preSegmentedImage) ) )
  isBoxAllowedToGrowLeft    = false;
// keep trying until none area can grow up anymore
} while (isBoxAllowedToGrowFront == true ||
  isBoxAllowedToGrowRight == true ||
  isBoxAllowedToGrowTop   ==  true  ||
  isBoxAllowedToGrowBack   ==  true ||
  isBoxAllowedToGrowLeft == true ||
  isBoxAllowedToGrowBottom == true );
```

Although the above embodiment discloses the use of an expanding rectangular bounding region, it should be noted that shapes other than rectangular may be used for the bounding region. Further, although this approach shows good results, there are some limitations that produce over segmented results together with some artifacts. These limitations are related to the failure to adapt a circular object (e.g. tumor) with a quadratic model (the 3D bounding box). When segmenting circular objects, leakage can not be resolved in many cases, because the corners of the bounding box can not be tested. The bounding box does not allow to take into account every part of the structure boundary. Therefore, the approach has been expanded to include an elliptical model to the segmentation procedure, where the 3D bounding box will still be used to limit the area where the preprocessing filter is applied.

Figure 9:
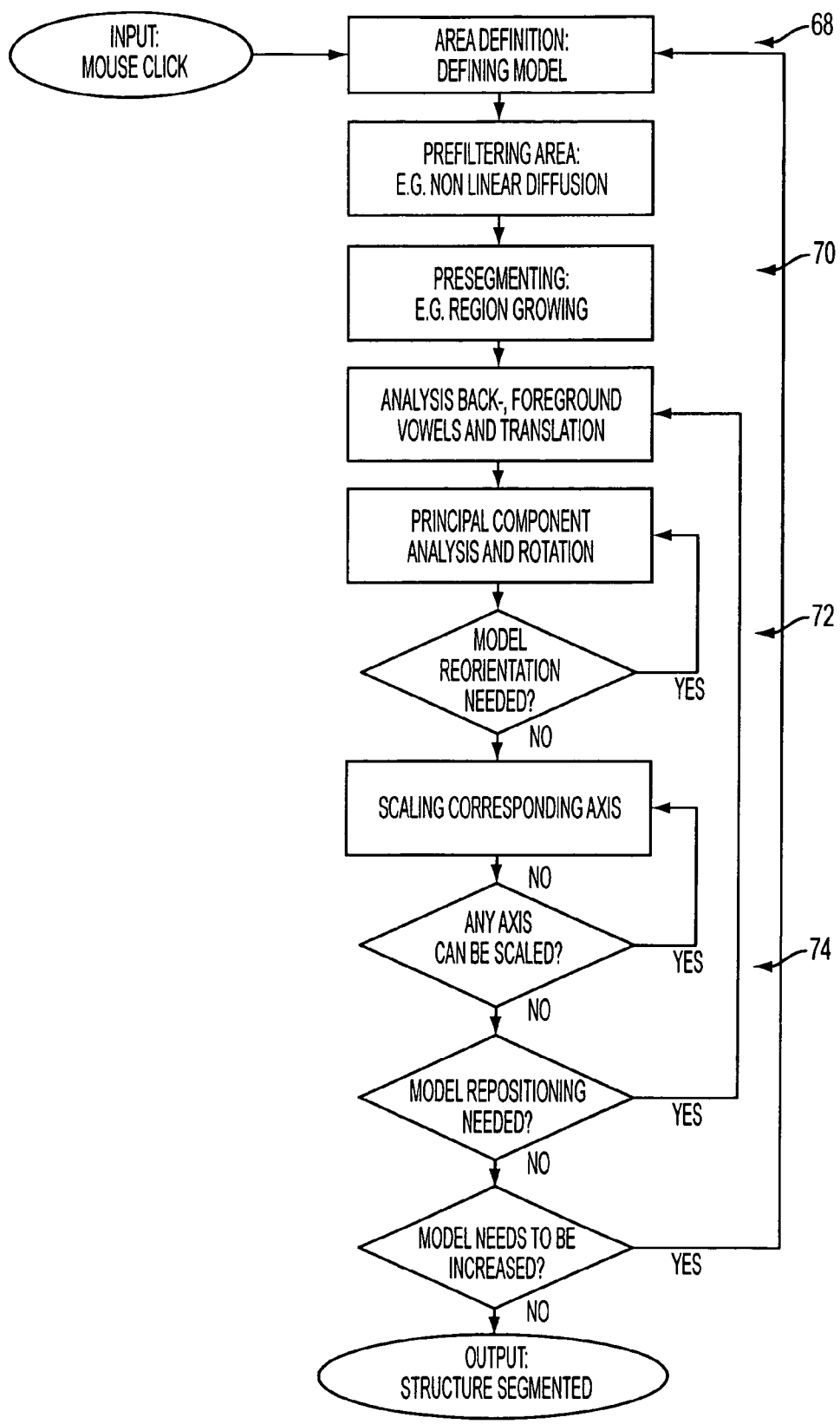
FIG. 9 illustrates steps performed in an adaptive processing step in accordance with another aspect of the present invention; method.

This approach, called the adaptive elliptical model approach, is discussed next. Referring to FIG. 9, the steps in accordance with one aspect of the present invention are illustrated. In step 70, pre-segmentation processing is performed. In step 72, processing to reorient and to finalize segmentation occurs. Then, in step 74, rescaling processing takes place.

In comparison with using a bounding box to restrict the result of the pre-segmentation procedure, the use of an elliptical model allows more efficient boundary criteria tests when segmenting an ellipsoid structure, since its shape can be better modeled. The procedure is based on an ellipsoid model using the equation below, whose origin is the seed point selected by the user.

$$\frac{x^2}{a^2} + \frac{y^2}{b^2} + \frac{z^2}{c^2} \le 1$$

Parameters a, b and c are the radius of the ellipsoid along the three axes of the ellipsoid, and x, y and z are the coordinates of all points (i.e., pixels or voxels) within the ellipsoid. Arbitrary rotations around the three coordinate axes, and a translation to get the ellipsoid into best correspondence with the area to be segmented, are permitted. Rotation and translation parameters are determined by boundary tests, which are explained in the following.

At the beginning of the procedure, in step 68, an initial 3D bounding box is created around the seed point. The seed point also becomes the center of the ellipsoid, which is created inside the bounding box in accordance with the equation discussed above. As the size of the ellipsoid increases during the segmentation process, the size of the bounding box is increased as well. The purpose of the bounding box here is just to limit the area where the pre-processing filter and the pre-segmentation filter are applied. All boundary tests are performed by the ellipsoid.

Figure 10A:
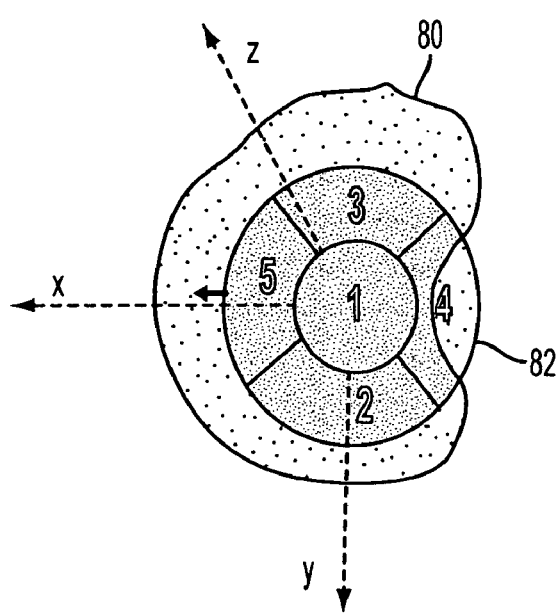
FIGS. 10 to 12 illustrate various aspects of the adaptive processing step shown in FIG. 7.
Figure 10B:
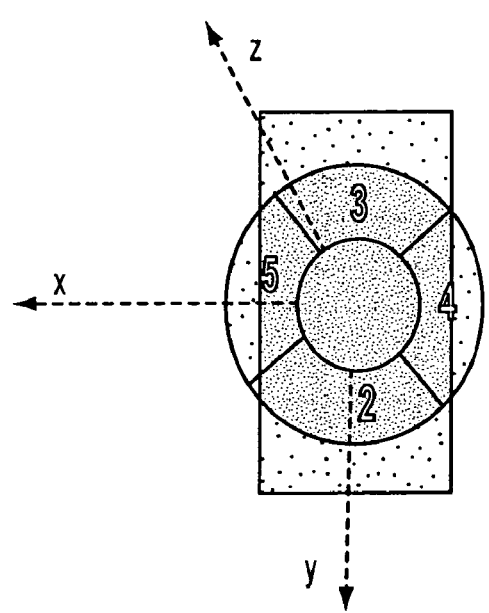

After running a smoothing filter (as previously discussed) and the pre-segmentation inside the bounding box, the boundary voxels of the ellipsoid are determined and for each sector the number of boundary voxels that are not part of the pre-segmented region (i.e. background voxels) is calculated. One sector competes with the sector on its opposite side in the way that the sector that has more background voxels will cause a translation of the whole adaptive model to its opposite position. See FIG. 10. In FIG. 10, a structure 80 to be segmented has an ellipsoid 82 over it. The ellipsoid has six segments, five of which (1-5) are visible. In the left hand side of the figure, sector 4 covers part of the structure 80 and part of the background of the image. On the other hand, sector 5 covers only the structure 80. Therefore, in accordance with one aspect of the present invention, the ellipse 82 is translated in the x direction (horizontally in the figure) to the left. Translation in the x direction is stopped when the boundaries associated with sectors 4 and 5 cover the same number of background pixels (voxels) in the image. The translation of the ellipsoid is considered in all directions, but translation in one direction is stopped when the background voxels are equally distributed on opposite sides.

Figure 11A:
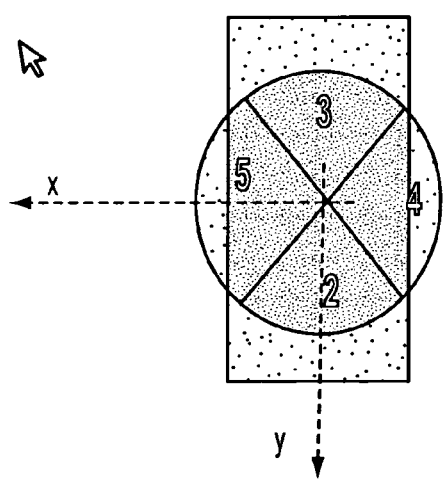
Figure 11B:
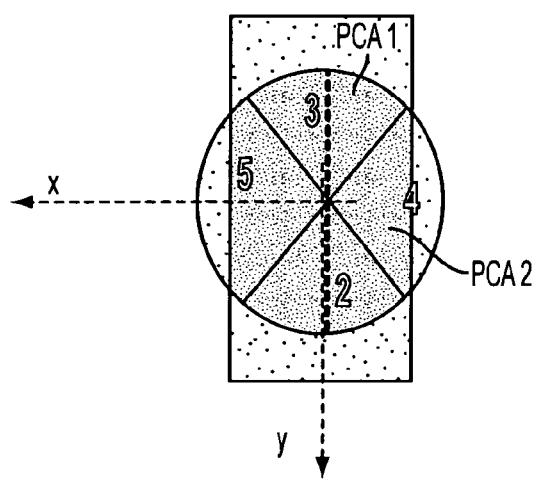

Reorientation of the model and finalizing Segmentation is the next step 72. A part of this workflow is to determine in which directions the ellipsoid has to grow in order to cover the whole structure. It is preferred to use principal components analysis to calculate the current axes of inertia of the pre-segmented structure within the ellipsoid (gray area inside the circle in FIG. 11. See, for example, Sabins FF: Remote Sensing: Principal and Interpretation, Freeman and Company, N.Y., US, 1996 and Anton, H: Elementary Linear Algebra, Wiley & Sons, 1987. It is preferred to standardize this volume by calculating the mean of the data points and subtracting it, so that the dataset mean is zero. From the resulting dataset the coefficients of the covariance matrix are calculated. Using the 3×3 covariance matrix the corresponding eigenvectors are calculated. These eigenvectors are normalized to unit eigenvectors which are perpendicular to each other. The first vector goes through the center of the data points minimizing the square of the distance of each point and going through the maximum variation in the data. The second and third vectors go also through the center minimizing the variation and are orthogonal to the other vectors (see the right side of FIG. 11 for an example). All three form the new local coordinate system of the ellipsoid, determining its rotation parameters and orientation within the dataset.

Figure 12A:
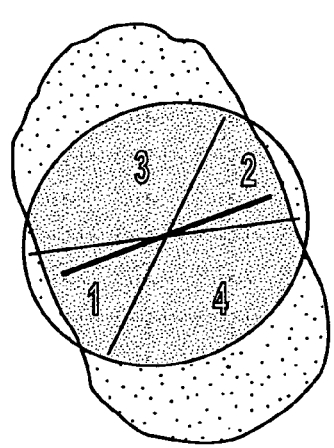
Figure 12B:
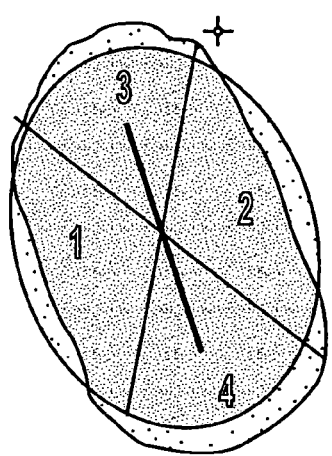
Figure 12C:
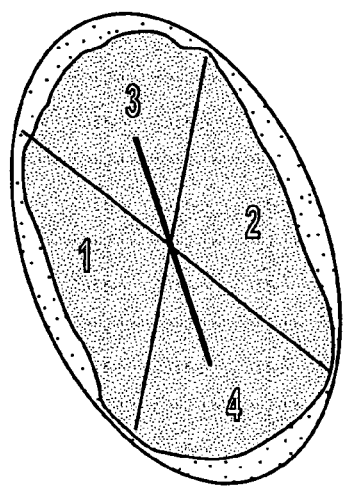

In the next step, the model is rescaled. For each pair of opposing sectors, the number of contour voxels intersecting the structure to be segmented is counted and set into comparison with the overall number of contour voxels in these sectors. If this ratio is higher than a specified threshold (0.75 has proven to work very well), the ellipsoid radius of the respective axis is increased. Otherwise the ellipsoid stops its growth process on this axis. This test is applied for each axis until all of them reach the stop criterion, i.e. the ratio is less than the threshold. FIG. 12 shows an example of the scaling procedure, where the grey area represents the pre-segmented image. The boundaries of sectors 1 and 2 cover the structure by less than 75% (the part over background is too large), which means that the ellipsoid will not grow along the axis defined by these sectors. The boundaries of sectors 3 and 4 on the other hand are nearly completely over the structure, so the ellipsoid is scaled along the respective axis until the stop criterion is reached (FIG. 12C).

Referring to FIG. 12, after the rotation of the model using the PCA, the model is scaled along the axis defined by sector 1 and 2. If the ellipsoid was grown along at least one of the axes, the whole procedure is repeated starting with the first step (translation) again, until the dimension of ellipsoid remains constant for one iteration. The pre-segmented area inside the ellipsoid is the final result of the segmentation procedure, everything outside of the ellipsoid will be considered leakage and cut off.

Only two parameters are used in order to adapt the approach to different datasets: Elasticity and Range of the Gray values. Elasticity defines how good the ellipsoid will be adapted to the pre segmented data. Elasticity has a range between 0 and 4. When elasticity is set to zero, the ellipsoid conserves its shape. This option is used in the case when the boundaries are not very clear. The value four is used when the tumor is isolated, so that the ellipsoid can adapt itself 100% to the pre segmented image without cutting any leaking. The default parameter used in the implemented prototype is 3, which helps to segment up to 70% of the datasets. In the other cases this parameter has to be adapted.

The model has been tested by segmenting 66 liver tumors of different shapes and sizes in CT datasets of different shapes and dimensions. All of the tumors were successfully segmented.

Figure 13:
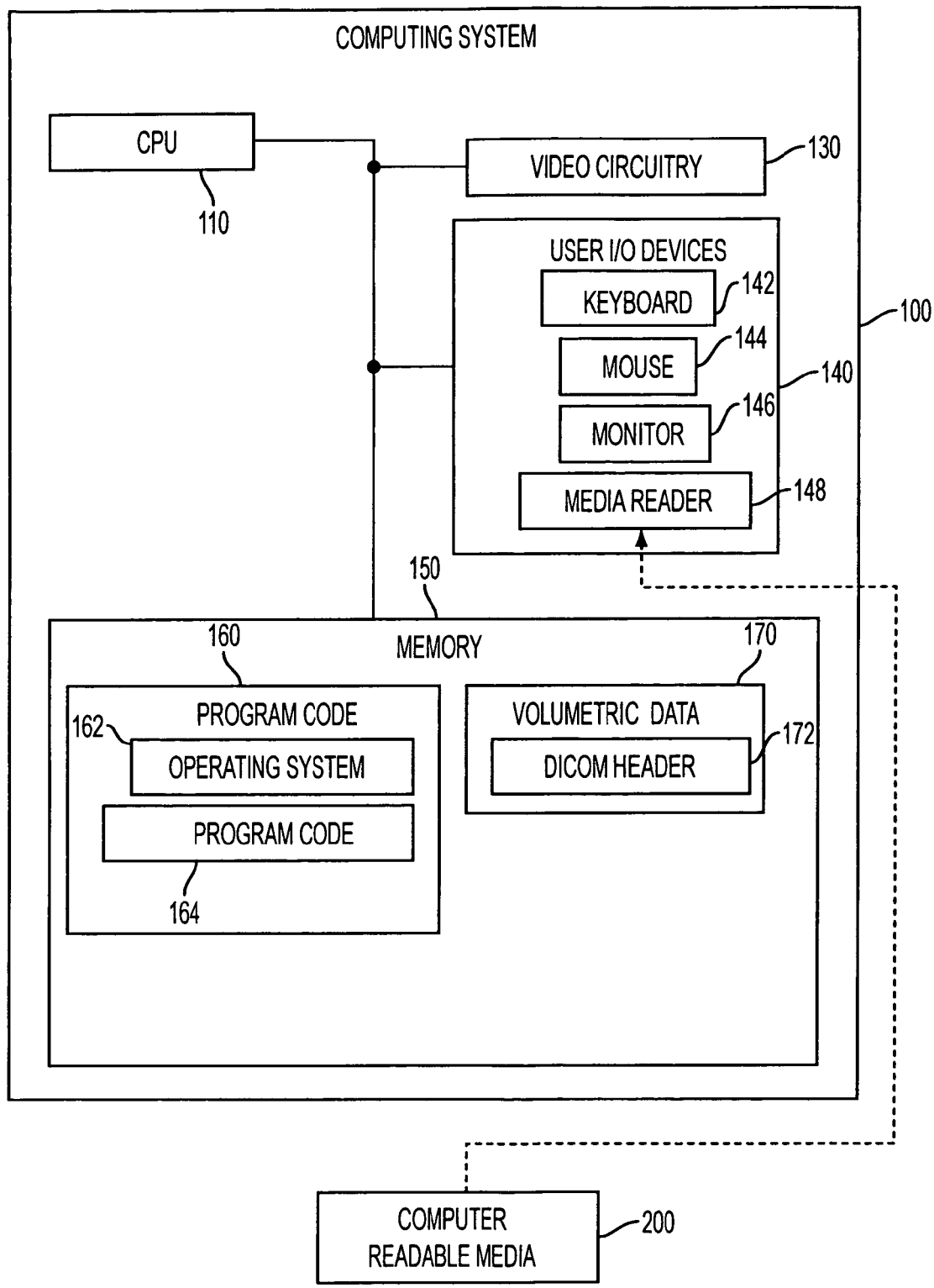
FIG. 13 illustrates a system in which the various methods of the present invention can be used.

FIG. 13 shows a computer system of the present invention. The computer system may include one or more central processing units (CPU) 110, video circuitry 130, other input/output devices 140 and memory 150 as well as other standard components. The video circuitry 130 drives a display and may also be used for processing. The other input/output devices 140 inlcude a keyboard 142, a mouse 144, a monitor 146 and a media reader 148 connected to a computer readable media 200. The memory 150 includes program code 160 that includes an operating system 162 and program code 164. The program code 164 includes application software operable on the processors 110 to perform each of the steps described herein; it may also include the video circuitry. The memory 150 also includes medical image date 170 to store the image data being processed.

Any type of computer system can be used, including without limitation, a personal computer, a workstation, a multiprocessor system, a parallel processing system or the like. Further, the processor can be a GPU, a CPU or any other processor circuit.

The adaptive approaches previously described perform well, particularly where objects can be modeled with an ellipsoid. Thus, the approach works with structures like kidneys, bladders and some tumors.

In some cases, however, after reaching the stop criteria of the ellipsoid model, sections remain with pre-segmented areas not covered by the ellipsoid. Thus, the ellipsoid or the bounding box approach does not segment objects completely. This is particularly true for concave shaped structures. In this case, users have to select multiple seed points, and the process requires multiple user steps.

The present invention extends the work flow illustrated in FIG. 9 so that as many shapes, preferably ellipsoids, as needed are used to model an object correctly. Thus, the process and apparatus of the present invention allows all shapes, regardless of whether convex or not, to be segmented.

The same two optional parameters previously mentioned, elasticity and range of intensity values, are available. Elasticity defines how well the ellipsoid is adapted to the presegmented data (closeness of fit).

In accordance with one aspect of the present invention, a user sets a seed point inside the structure being segmented. The steps of FIG. 9, as previously discussed, are performed and a shape that models the structure being segmented is generated.

In many cases, the shape adequately represents the structure being segmented. In other cases, however, it does not.

Thus, in accordance with the present invention, before testing whether the segmentation generated by a first shape covers the entire pre-segmented image, a list is created that holds parameters that describe the ellipsoid model used to obtain the result of the previous step. The list is updated every time a new iteration occurs to keep track of all models created. With the parameters stored in a list, every model created can be reconstructed so that different tests can be performed to avoid creating the same model more than one time. The parameters kept in the list are: coordinates of the three axes where the model was build, the seed point of the model and the dimensions of the model.

Figure 14:
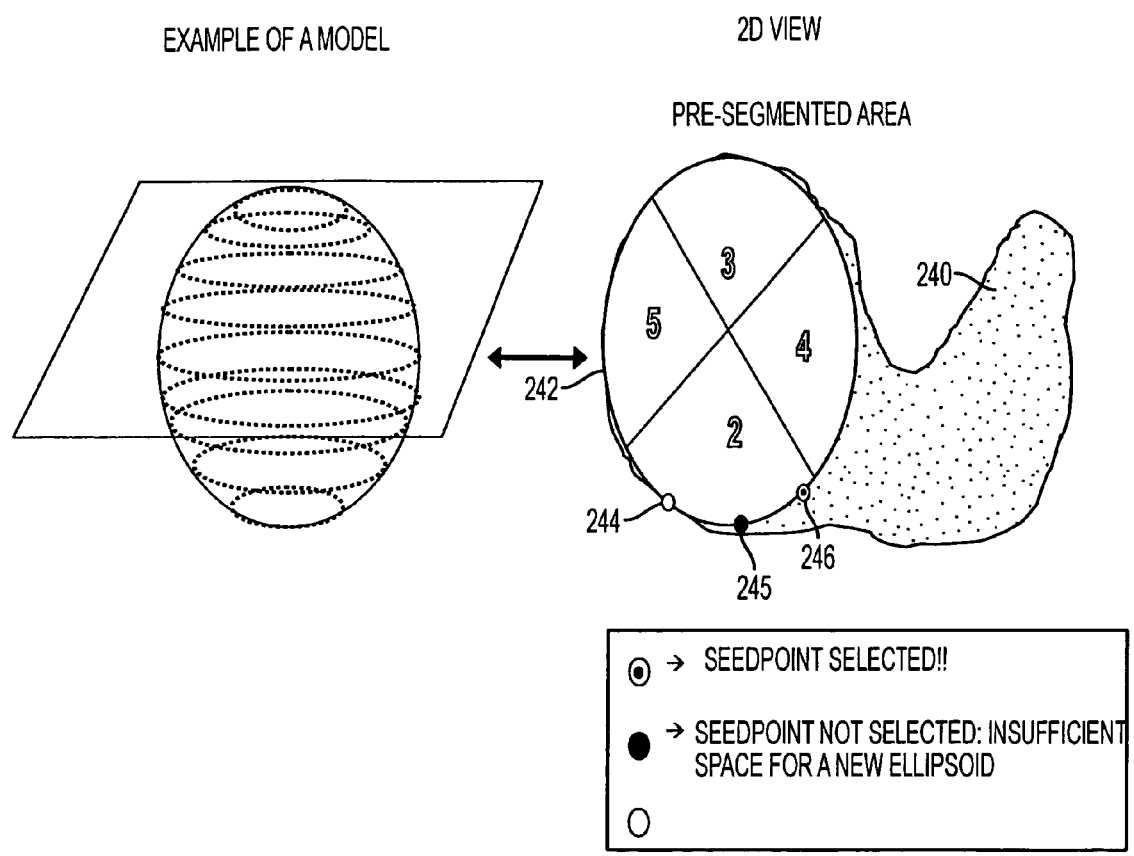
FIG. 14 illustrates a process used to test for potential seed points in accordance with one aspect of the present invention.

The next step is to determine whether a region is undersegmented. For this purpose, in accordance with one embodiment of the present invention, all points on the perimeter of the model are evaluated. Referring to FIG. 14, the left side demonstrates that potential seed points located on a perimeter of a shape are evaluated. All possible seed points on the perimeter of the shape are evaluated. It is preferred to evaluate for two conditions. First, the potential seed point must be within the pre-segmented area. Second, the potential seed point must have sufficient space surrounding it so that a new ellipsoid would also be entirely within the pre-segmented area. On the right side of FIG. 14, a pre-segmented area 240 has been generated. A first shape 242 inside the pre-segmented area 240 has been generated in accordance with various aspects of the present invention.

The potential seed points are on the perimeter of the first shape 242. Some of the potential seed points could be selected, if they meet certain criteria, to generate further shapes. Three examples of potential seed points 244 to 246 are shown. Seed point 244 in accordance with one aspect of the present invention, is not selected to use to grow further shapes because the point 244 is either on the perimeter or outside of the pre-segmented area 240.

Potential seed point 245 is also not selected to use to grow further shapes in accordance with another aspect of the present invention. This is because the potential seed point 245 is not surrounded by sufficient area of the pre-segmented area 240. The amount of area of pre-segmented area 240 that should surround any of the seed points to justify growing a new shape depends on the application of the present invention.

From the three seed points shown in FIG. 14, potential seed point 246 is preferably selected for use to grow a new shape. This is because the seed point 246 is inside the pre-segmented area 240 and because there is sufficient space of the area 240 surrounding it.

Any type of shape can be grown in accordance with the present invention. In accordance with a preferred embodiment, however, an ellipsoid is used. Further, while two dimensional space is illustrated, the present invention is implemented in two and three dimensional shapes.

Each model (or shape) is tested under the conditions set forth above. When the model reaches a stop criteria, areas are tested to find undersegmented areas. Essentially, after a model or object has been created and a list of potential seed points created, a new model or object is created. Potential seed points inside the new model/object are discarded, and processing continues with potential seed points outside the new model/object. Additional models/objects are created from the potential seed points, with potential seed points that are inside the additional models/objects being discarded. The process is then repeated on the newly created models/objects which were created in undersegmented areas. Processing continues until there are no more potential seed points to consider.

When working in 3D space a high number of potential seed-points can be produced. Not all of these points are needed for correctly segmenting the area not covered. As a result, another test consists of checking if the selected seed points are part of an already created model. Only points that are not part of an existing model or any new model are kept in the list of seed-points. The list of created models that is created and updated in step two of the iteration is used to decide which points are kept as seed points and which should be discarded. This procedure allows the creation only of the number of models needed without redundancy, making the procedure faster.

Figure 15:
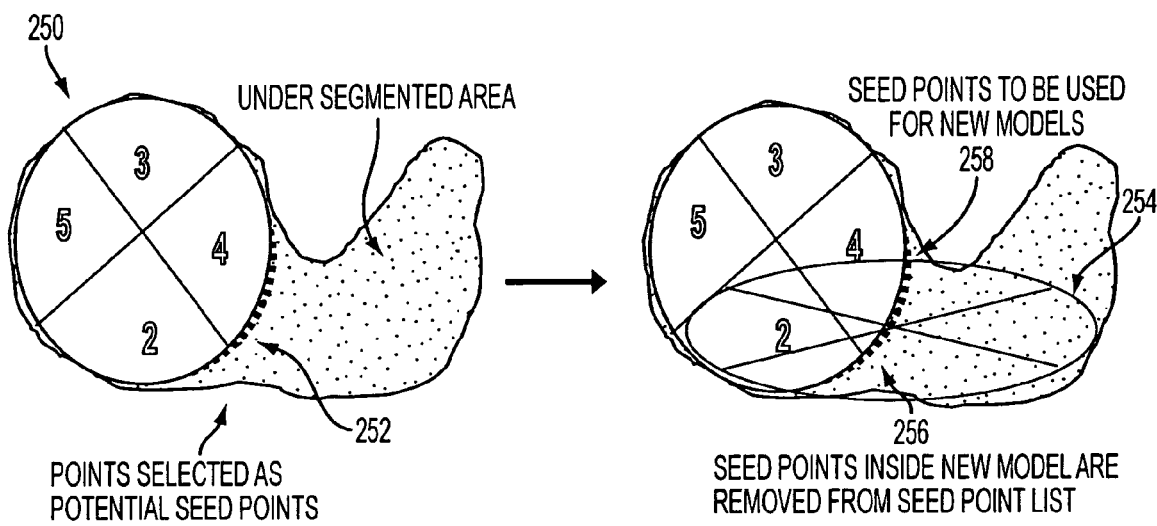
FIG. 15 illustrates the selection of potential new seed points and the removal of seed points.

This is illustrated further in FIG. 15. In the situation 250 the potential seed points 252 are identified in accordance with the evaluation criteria set forth above. The shape 254 is grown based on one of the seed points 252. Then, the seed points 256 inside the shape 254 are removed from the seed point list. Only the seed points 258 outside the shape 254 are considered for building a new model by growing a new shape.

Before starting the growth procedure of a new model, a test is performed that measures the area around the model. If the area of pre-segmented space around the seed point is too small, then the model is not created because the area doesn't offer enough space for a new model to grow. In that case the seed point is removed from the list of seed points and the next seed point in the list used to create a model. A five millimeter diameter has shown good results for this test, although other distances can also be used.

The generation of new models (ie the growth of new shapes) is stopped when the seed point list is completely tested and for each element the decision is made whether to use it to create a new model or to discard it because does not fulfill the requirements discussed in the last sections. Every time a new model is created, new seed points are added only if the new model doesn't cover the whole pre-segmented area. Keeping a list of the model parameters avoids creating models in places where other models already exist. There are no restrictions regarding the number of models that can be created. This number only depends on the size of the region to be segmented.

Figure 16:
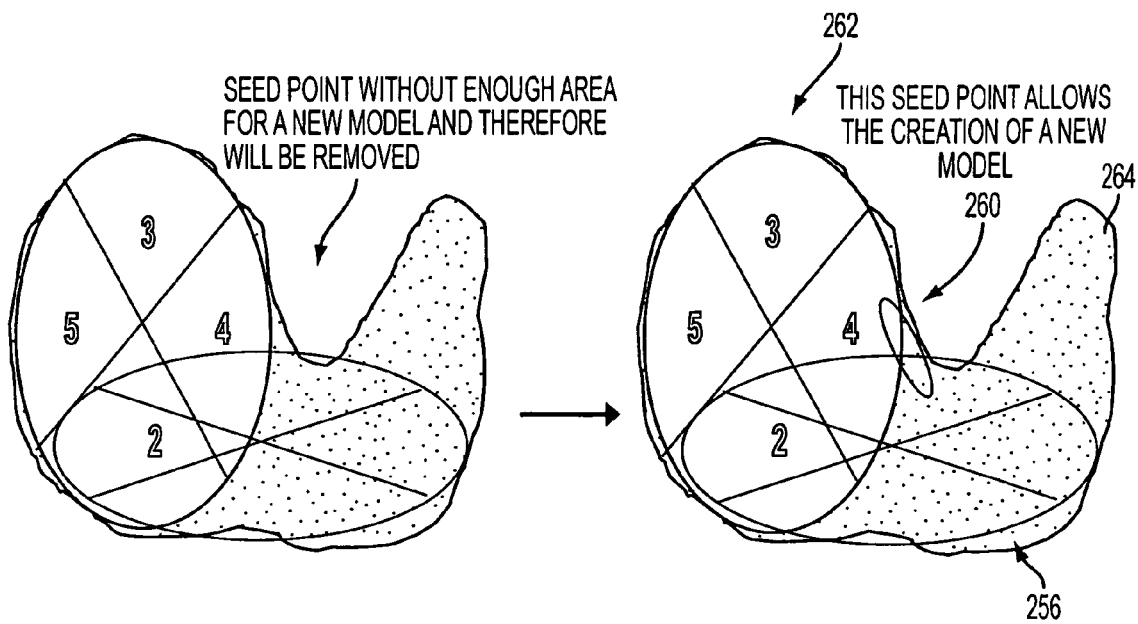
FIG. 16 further illustrates the selection of seed points.

This is further illustrated in FIG. 16. As a result of the situation discussed in FIG. 15, a shape 260 is grown around one of the seed points 258. Each of the possible seed points on the shape 262 are tested in accordance with the evaluation standards set forth previously and new models/shapes developed until there are no seed points on the shape 262 that satisfy the evaluation conditions. Then, the shape 256 is tested for new seed points. Based on the process already described, new models/shapes will be developed to cover the area 264 in the pre-segmented area. This process of iteratively building new models/shapes continues until there are no new seed points satisfying the evaluation criteria.

Figure 17:
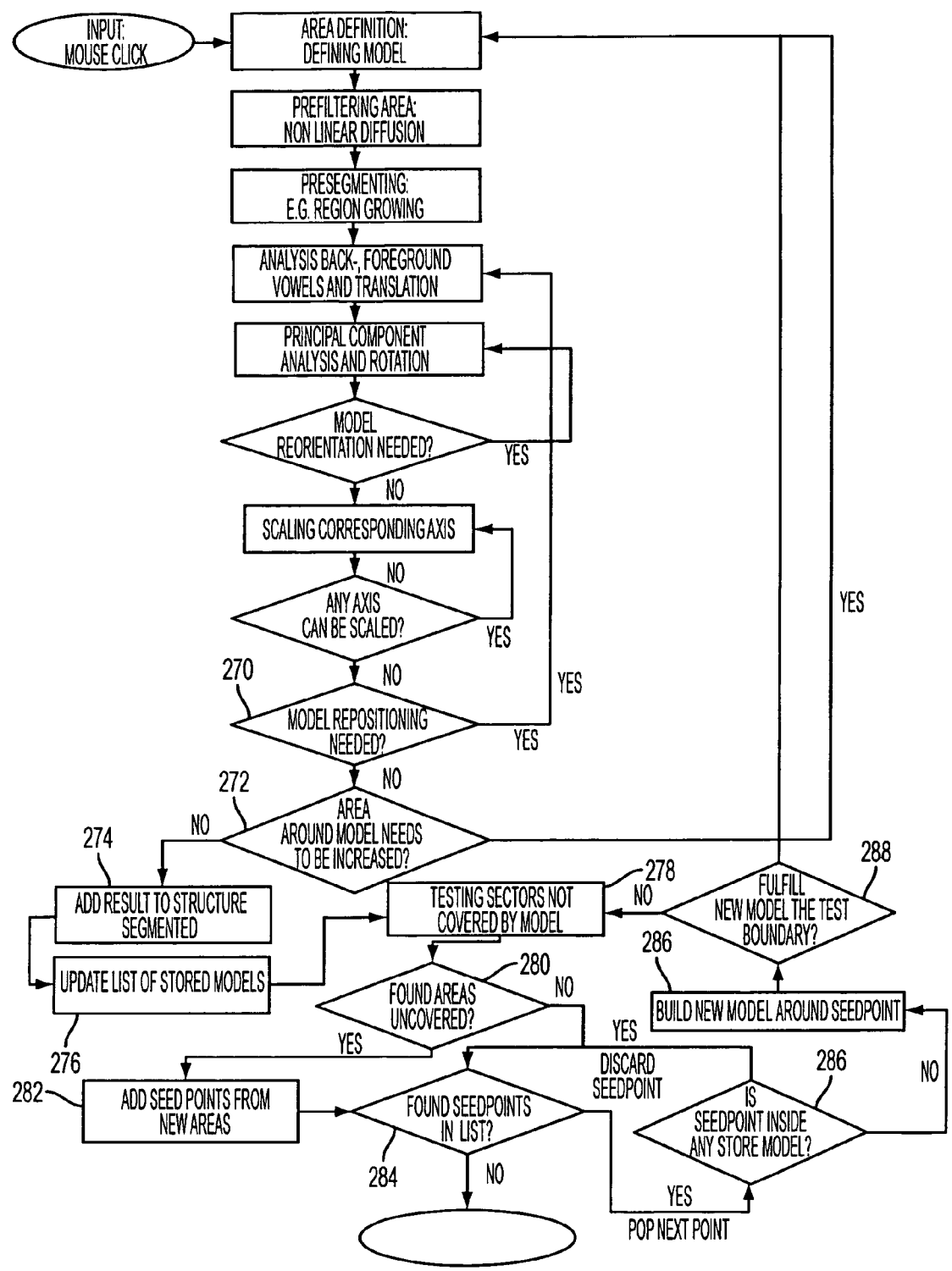
FIG. 17 illustrates steps performed in accordance with an aspect of the present invention.

FIG. 17 illustrates the process in accordance with one aspect of the present invention. In step 272, once the model has reached an appropriate size, the model information is added to the previously described list in steps 274 and 276. In steps 278 and 280, sectors not covered by the model are tested. If new areas are found, then in step 282, new seed points are added after evaluating points on the model/object, preferably the points on the perimeter of the model/object as illustrated in FIG. 14. In step 284, the application software running on a computer tests the list of potential seed points. If no potential seed points are found, then processing stops. On the other hand, if potential seed points are in the list, then in step 286, the next potential seed point is popped and it is determined whether the potential seed point is inside the model/object. If it is inside a model/object that has already been grown, the potential seed point is discarded, and processing returns to step 284. If the potential seed point is not inside an existing model/object, then in step 286 a new model/object is built. In step 288, it is determined whether the new model/object fulfills the evaluation requirements, that is, whether there is sufficient object space in the new model/object. If there is not, then processing continues in step 278. If there is then processing continues from the beginning. The processing continues until the potential seed points are exhausted so that the list Of potential seed points is empty. See step 284.

Figure 18:
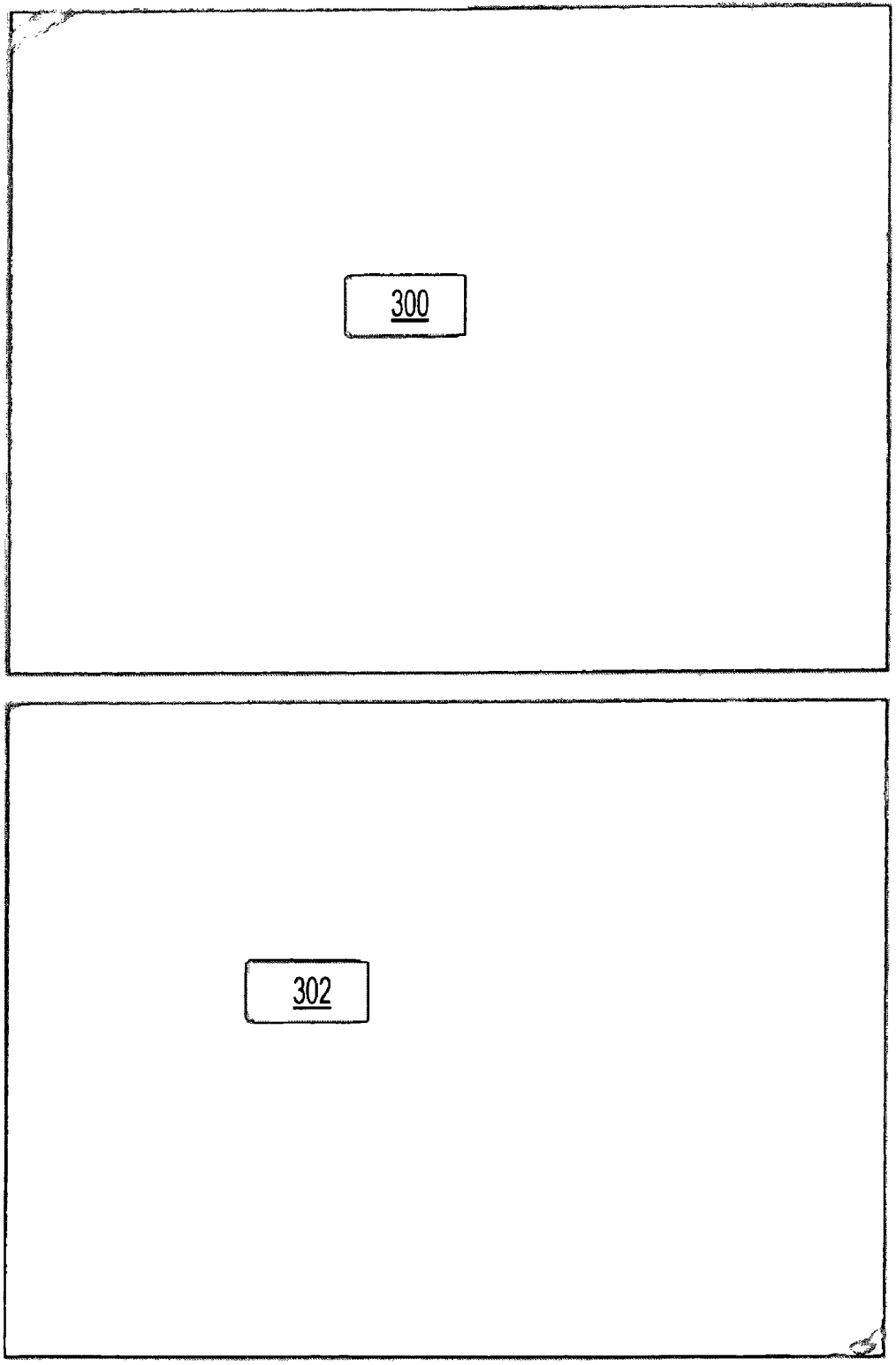
FIG. 18 illustrates results obtained in accordance with an aspect of the present invention.

The process in accordance with one aspect of the present invention was tested on CT, MR and PET datasets, and objects were successfully segmented with only one mouse click. FIG. 18 illustrates the successful segmentation of objects 300 and 302 in accordance with an iterative application of the various aspects of the present invention. Objects 300 and 302 are tumors that would have not been fully segmented without an iterative approach.

The process and apparatus of the present invention are performed on two dimensional and on three dimensional objects. Further, the system of FIG. 13 can be used to implement all of the aspects of the present invention.

The following references are incorporated herein by reference: (1) Russ JC: Image Processing Handbook, CRC Press, Boca Raton, London, New York, Washington DC, 131-166, 2002; (2) Gonzalez RC, Woods RB: Digital Image Processing, Addison-Wesley, Reading, Mass., 1993; (3) Perona P, Malik: Scale-space and edge detection using anisotropic diffusion, IEEE Transactions on Pattern Analysis Machine Intelligence, 12:629-639, 1990; (4) Weickert J: Foundations and application of non linear anisotropic diffusion filtering, Zeitschrift fuer angewandte Mathematic und Mechanic, Vol 76, pp 283-286, 1996; (5) Morton KW, Mayern DF, Numerical Solution of Partial Differential Equations, Cambridge University Press, Cambridge, 1994; (6) Weickert J.: Non linear Isotropic Diffusion H: Semldiscrete and discrete Theory, Fakultaet fuer Mathematik and Informatik, Universitaet Mannheim, 2001; (7) Bernd J.: Digitale Bildverarbeitung, Springer-Verlag, Berlin, Heidelberg, New Yofic, 1993; (8) Sabins FF: Remote Sensing: Principal and Interpretation, Freeman and Company, New York, US, 1996; (9) Anton, H: Elementary Linear Algebra, Wiley & Sons, 1987.

In the following disclosure, the term "pixel" is used to indicate a data structure that is used to compose an image. Although the term typically indicates a two-dimensional element, for purposes of the following disclosure, "pixel" is also intended to include three-dimensional picture elements, i.e., voxels.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A computer-implemented method for segmenting an object in a set of image data wherein a first shape has been grown inside the object based on a seed point, comprising:
   a processor configured to perform the following steps:
      testing points on the first shape to determine a first set of one or more seed points;
      growing a second shape inside the object based on one of the seed points in the first set; and testing points on a perimeter of the second shape to determine a second set of one or more seed points; and growing a third shape inside the structure based on one of the seed points in the second set.

2. The method as claimed in claim 1, comprising growing a third shape inside the structure based on other seed points in the first set.

3. The method as claimed in claim 1, comprising:

reiteratively testing points on a perimeter of a shape that was previously grown inside the structure to determine a further set of seed points; and growing another shape inside the structure based on one of the seed points in the further set.

4. The method as claimed in claim 1, wherein the first and second shapes are elliptical.

5. The method as claimed in claim 1, wherein the first and second shapes are bounding boxes.

6. The method as claimed in claim 1, wherein the first set of one or more seed points are located on the perimeter of the first shape.

7. The method as claimed in claim 1, wherein each of the one or more seed points are inside the object and have a predetermined amount of space of the object around it.

8. The method as claimed in claim 2, wherein the other seed points in the first set is not inside the second shape.

9. The method as claimed in claim 3, wherein the step of testing points continues until each of the seed points in the further set of seed points do not have a predetermined amount of object space around it.

10. A system for segmenting an object in a set of image data wherein a first shape has been grown inside the object based on a seed point, comprising:

a computer;

application software on the computer, operable to:

test points on the first shape to determine a first set of one or more seed points;

grow a second shape inside the object based on one of the seed points in the first set; and test points on a perimeter of the second shape to determine a second set of one or more seed points; and grow a third shape inside the structure based on one of the seed points in the second set.

11. The system as claimed in claim 10, wherein the application software is further operable to grow a third shape inside the structure based on additional seed points in the first set.

12. The system as claimed in claim 10, wherein the application software is further operable to:

reiteratively test points on a perimeter of a shape that was previously grown inside the structure to determine a further set of seed points; and grow another shape inside the structure based on one of the seed points in the further set.

13. The system as claimed in claim 10, wherein the first and second shapes are elliptical.

14. The system as claimed in claim 10, wherein the first and second shapes are bounding boxes.

15. The system as claimed in claim 10, wherein the first set of one or more seed points are located on the perimeter of the first shape.

16. The system as claimed in claim 10, wherein each of the one or more seed points are inside the object and have a predetermined amount of space of the object around it.

17. The system as claimed in claim 11, wherein the additional seed points in the first set is not inside the second shape.

18. The system as claimed in claim 12, wherein the application software is further operable to continue testing points until each of the seed points in the further set of seed points do not have a predetermined amount of object space around it.

* * * * *